Jan. 15, 1963 L. L. HERCIK 3,073,200
ECCENTRIC DRIVE MEANS FOR STOCK SHEAR
Original Filed Aug. 24, 1956 5 Sheets-Sheet 1

INVENTOR.
LAD L. HERCIK
BY
Meyer, Baldwin, Doan & Young
ATTORNEYS

INVENTOR.
LAD L. HERCIK

INVENTOR.
LAD L. HERCIK

Jan. 15, 1963 L. L. HERCIK 3,073,200
ECCENTRIC DRIVE MEANS FOR STOCK SHEAR
Original Filed Aug. 24, 1956 5 Sheets-Sheet 4

INVENTOR.
LEO L. HERCIK
BY
Meyer, Baldwin, Egan & Young
ATTORNEYS

INVENTOR.
LAD L. HERCIK
BY
Meyer, Baldwin, Doran & Young
ATTORNEYS

United States Patent Office 3,073,200
Patented Jan. 15, 1963

3,073,200
ECCENTRIC DRIVE MEANS FOR STOCK SHEAR
Lad L. Hercik, 17510 Daleview Ave., Lakewood, Ohio
Original application Aug. 24, 1956, Ser. No. 606,154, now Patent No. 3,039,344, dated June 19, 1962. Divided and this application Feb. 26, 1960, Ser. No. 11,273
1 Claim. (Cl. 83—602)

This invention relates to improvements in a shear and more particularly to a lever type shear for bar or billet stock.

This application is a division of my copendent application Serial No. 606,154, filed August 24, 1956, now U.S. Patent No. 3,039,344, granted June 19, 1962, for "Stock Shear."

One of the objects of the present invention is to provide a connecting rod or pitman subjected to a large tensile force, such as the weight of a heavy shear arm supported thereby, with a bearing cap detachably connected to the remainder thereof so that the bearing bore formed thereby will not be substantially enlarged by this tensile force.

A further object of the present invention is a gear and crank drive construction for providing an oscillating movement in a mechanism, such as in a lever type shear, wherein the radial arm or cheek of the crank is recessed into the face of the gear with means securing it therein, whereby the axial distance between the gear and crank pin is minimized and the torsional wind-up of the mechanism is also minimized.

A further object of the present invention is to provide a bar or billet shear characterized by its structural simplicity of design, low maintenance expense, strong and sturdy nature, economy of operation, ease of assembly of its component parts, compactness of design, multiplicity of functions performed by each component part wherever possible, and ease of operation during bar or billet shearing.

Other features of this invention reside in the arrangement and design of the parts for carrying out their appropriate functions.

Other objects and advantages of this invention will be apparent from the accompanying drawings and description and the essential features will be set forth in the appended claim.

In the drawings:

FIG. 7 is an enlarged partial view of FIG. 1 with the movable shear arm in its lowest position at the end of its cut-off stroke prior to the start of its return stroke; while

Before the lever-type bar and billet shear here illustrated is specifically described, it is to be understood that the invention here involved is not limited to the structural details or arrangement of parts here shown since mechanisms embodying the present invention may take various forms. It also is to be understood that the phraseology or terminology herein employed is for purposes of description and not of limitation since the scope of the present invention is denoted by the appended claim.

While the present invention may be adapted to various types of machines, it has been chosen to show the same as applied to a lever-type shear for bar or billet stock.

Figure 1:
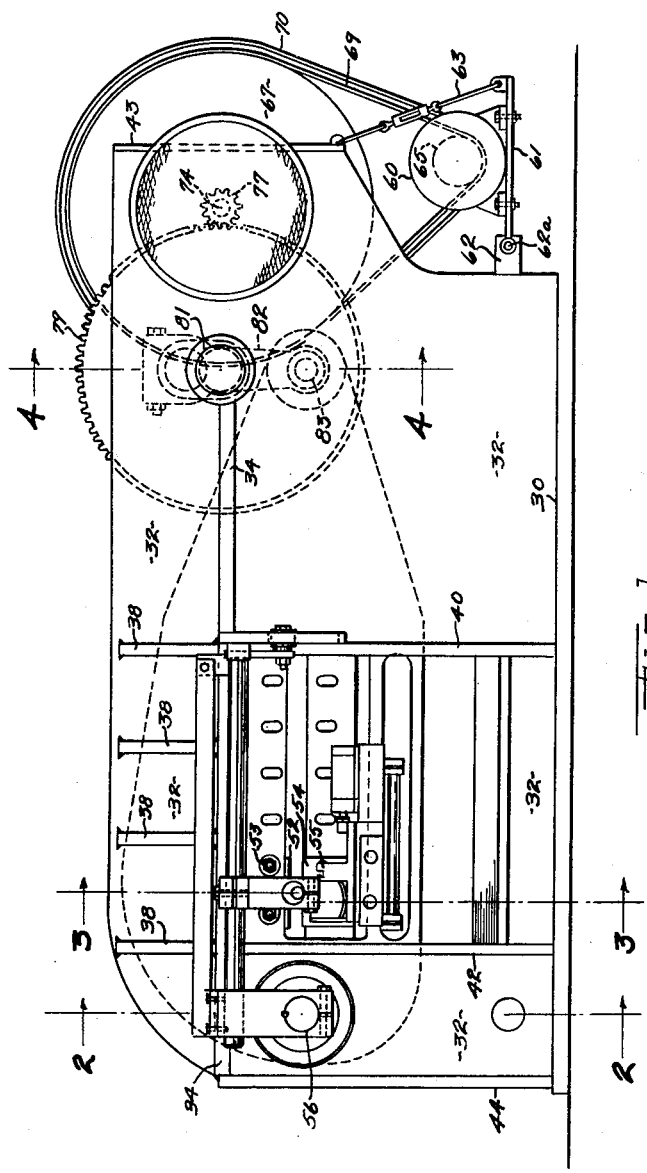
FIG. 1 is a side elevational view of a bar or billet shear with its shear arm or cutter member in its raised position positioned to start downward movement through its shearing or cut-off stroke.
Figure 2:
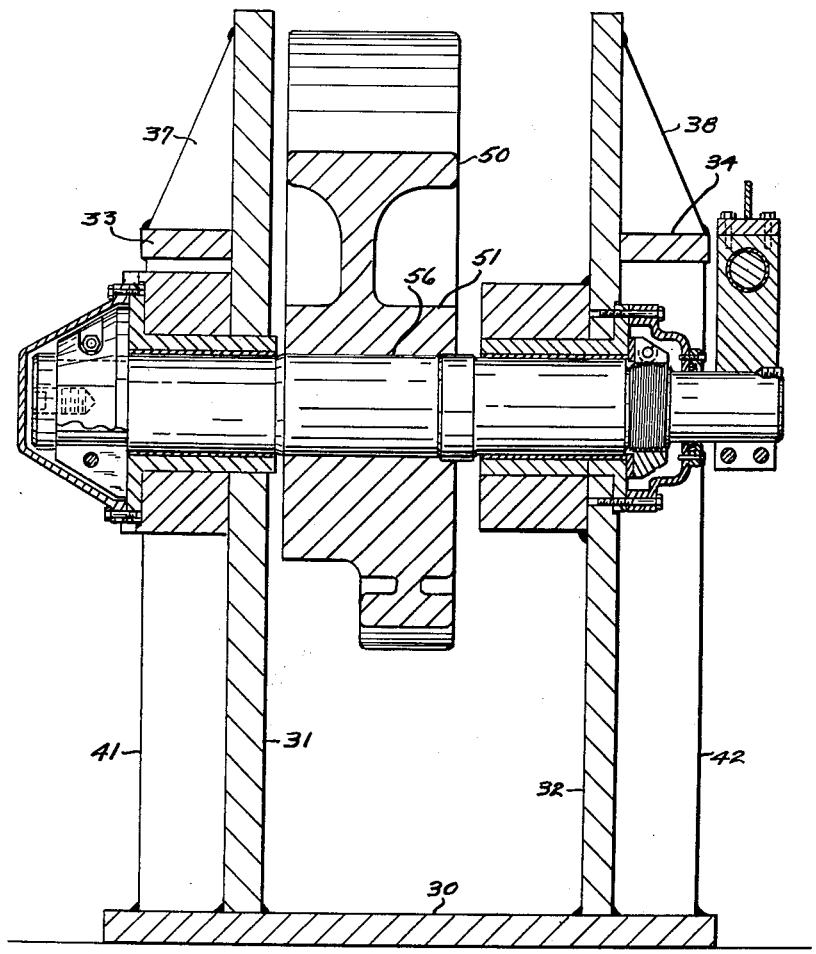
FIG. 2 is a vertical sectional view taken along the line 2—2 of FIG. 1 longitudinally through the king pin of the shear.

The frame of the shear includes a base plate 30 having welded thereto two vertical frame plates 31 and 32 in FIG. 2 extending parallel to each other and at right angles with respect to the base plate 30. The vertical plates 31 and 32 extend substantially throughout the length of the machine with the outward sides of each having generally the same reinforcing ribs, rails or frame plate structure secured thereto. This structure includes for these respective vertical plates horizontal reinforcing ribs or rails 33 and 34 and fourteen ribs or rails 37, 39 and 41, and 38, 40 and 42. Vertical frame plates 31 and 32 are connected at opposite ends by end plates 43 and 44 in FIG. 1, a blade or knife seat block 46 in FIG. 3 secured to frame plate 31 and base 30 with suitable spacers 47 and a connecting plate 48 secured at opposite ends to block 46 and vertical frame plate 32. All of these plates, rails, ribs, spacers and blocks are secured together to make a rigid frame in any suitable manner with the preferred securing means being welds, as illustrated in the drawings.

Figure 3:
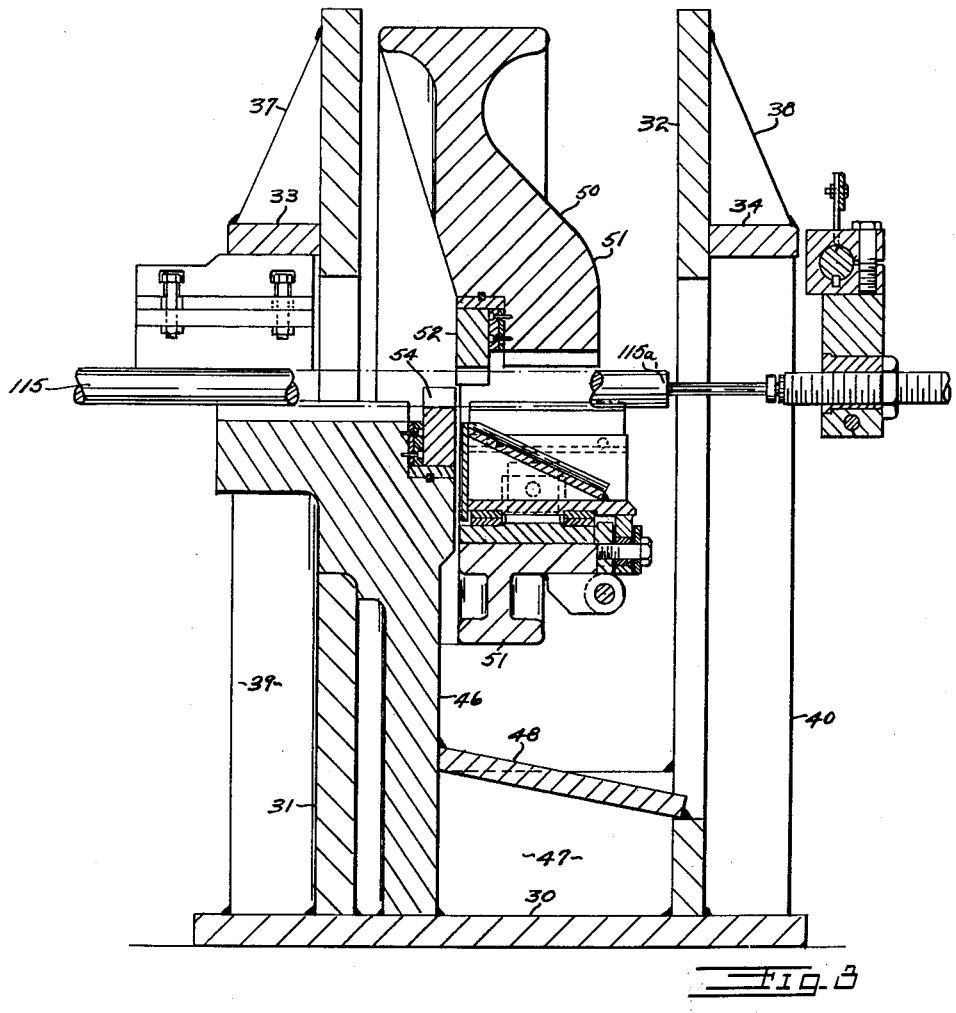
FIG. 3 is a vertical sectional view taken transversely through the shear along the line 3—3 of FIG. 1 longitudinally through the stock, such as a bar or billet, to be sheared by the machine.
Figure 7:
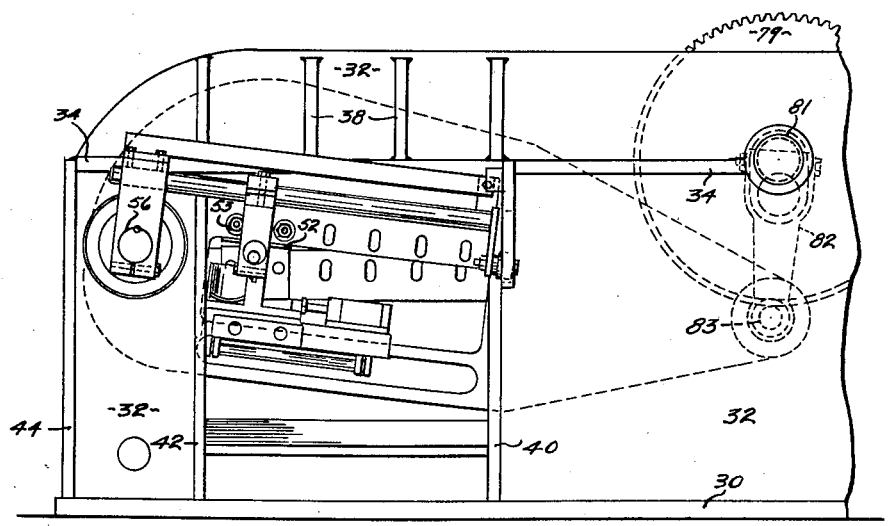

The shear includes two cutter members carrying coacting blades with the cutter members taking the form of a stationary cutter member including the machine frame and block 46 in FIG. 3 and a movable cutter member taking the form of shear arm 50. The movable cutter member or shear arm 50 includes an arm frame part 51 having an upper blade or knife 52 detachably secured thereto by a plurality of nut and bolt units 53 in FIG. 1 spaced along the length of the blade. The stationary cutter member includes in addition to the machine frame and block 46 a lower knife or blade 54 detachably secured to block 46 by another series of nut and bolt units 55 spaced along the length thereof. The cutter members are operatively connected together for relative movement with this operative connection taking the form of a pivot or king pin 56 in FIGS. 1 and 2. The king pin pivotally connects arm frame 51 and frame plates 31 and 32 to permit oscillation of this shear arm 50 in opposite directions with the shear arm movable clockwise during the cut-off stroke from the raised position in FIG. 1 to the lowered position in FIG. 7 for moving the blades 52 and 54 relative to each other in a shear plane. Also, the shear arm 50 is swingable counterclockwise in a return stroke from the lower position in FIG. 7 back to the raised position in FIG. 1.

Figure 8:
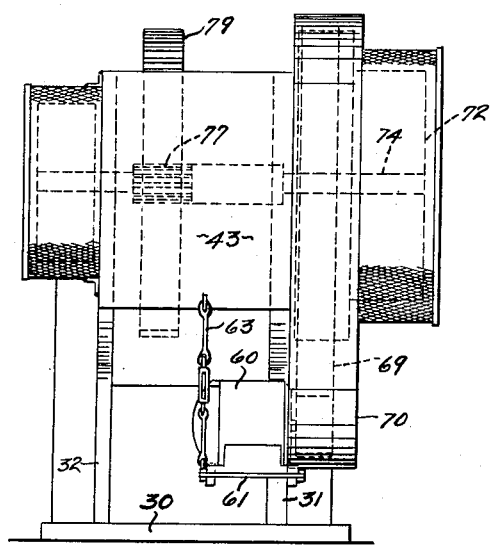
FIG. 8 is an end view of the right end of the shear in FIG. 1 looking from the right toward the left at the shear.

A suitable drive is provided for oscillating this shear arm 50 through its shear or cut-off stroke and return stroke. Electric motor 60 in FIGS. 1 and 8 is mounted on a platform base 61 secured to frame plate 31 by a bracket 62 with a pivot 62a provided between bracket 62 and base 61. Supporting link 63 is secured at opposite ends to eyes in base 61 and frame end plate 43. Link 63 has a turnbuckle construction intermediate its ends for adjusting the belt tension of driving belt 69. A drive pulley 65 on motor 60 drives driven pulley and fly wheel 67 by belt 69 covered by belt guard 70. Driven pulley 67 drives a drive shaft 74 through an air actuated clutch 72. Drive shaft 74 has a driving gear 77 secured thereto for driving driven gear 79 with a gear driven crank, oscillation producing mechanism. Gear 79 is keyed to crank shaft 81 in FIG. 4 with said crank shaft rotatably mounted at opposite ends in frame side plates 31 and 32 with this crank shaft driving a connecting rod 82 rotatably secured at its lower end by a pin and bearing unit 83 to the distal end of the arm frame part 51 of shear arm 50. This connecting rod 82 supports and moves in opposite directions the shear arm 50 at a point farther than blade 52 in FIG. 1 from king pin 56 so as to provide substantial mechanical advantage in performing the shearing cut so that the shear may easily cut large size bars of billets.

In a shear for cutting large size bars and billets, shear arm 50 has substantial weight with its weight in some machines being over six tons. This large weight, the large inertia of the moving parts in the shear, the large forces exerted on the component parts, and the resistance of the stock to the shearing action causes many problems in shear design. Hereinafter is disclosed specific structures for solving some of these problems with these structures including the connection between crank shaft 81 and driven gear 79, and the specific construction of the connecting rod or pitman 82 for effectively resisting the large tensile force exerted endwise thereon by heavy shear arm 50.

Figure 5:
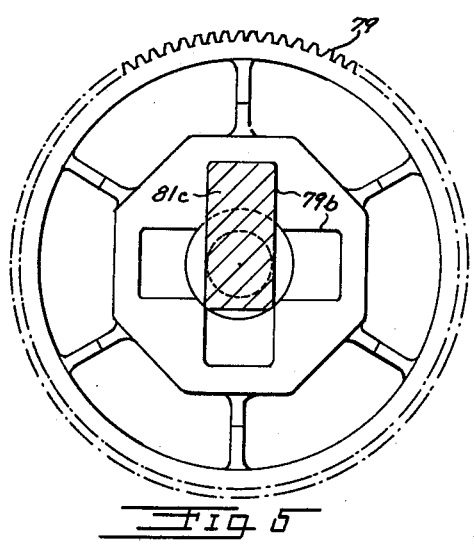
FIG. 5 is a vertical sectional view taken along the line 5—5 of FIG. 4 showing the embedded construction of the crank in the drive gear.
Figure 4:
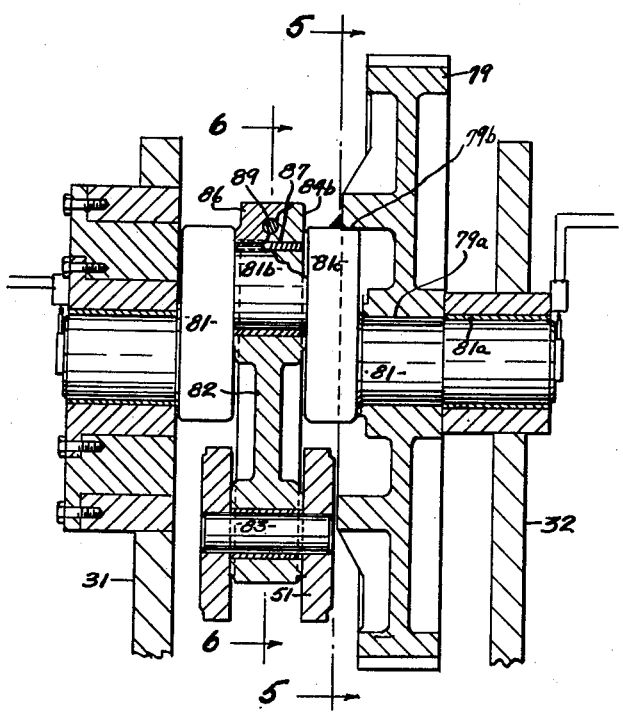
FIG. 4 is a vertical sectional view taken along the line 4—4 of FIG. 1 through the drive gear, crank and connecting rod or pitman in the oscillation drive for the movable shear arm.

Crank shaft 81 and its drive gear 79 are rigidly connected together to drive as a unit. Drive gear 79 in FIG. 4 has a central bore 79a telescoped over and keyed to a shaft portion 81a of crank shaft 81. Crank shaft 81 has a crank pin portion 81b radially offset from the rotational axis of the shaft portion 81a and rotatably mounted in one end bore of the connecting rod or pitman 82 with this radial offset causing the oscillation movement of the shear. Crank pin arm 81c connects shaft portion 81a and crank pin portion 81b and is welded into a radially extending recess 79b radially extending in one face of the gears 79, as shown in FIGS. 4 and 5. This construction minimizes the axial distance between gear 79 and crank pin portion 81b in FIG. 4 for any given gear strength so that they will act as a single drive unit, will provide a strong drive component, and will reduce the torsional wind-up in the mechanism during movement of the heavy, movable shear arm 50 in contrast with the construction wherein crank pin arm or cheek 81c is not imbedded in the face of gear 79. Two or more recesses or pockets 79b, such as the four in FIG. 5, may be provided in the face of gear 79 to permit repositioning of the crank arm 81c so as to distribute the wear on the teeth of gear 79 produced by a large force periodically exerted thereon at the same circumferential point.

Figure 6:
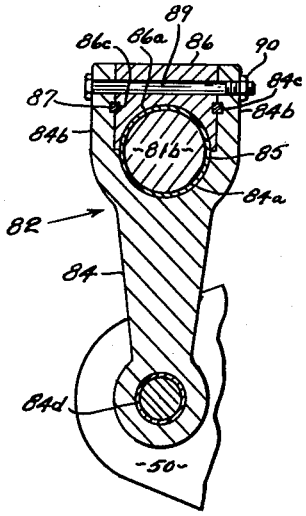
FIG. 6 is a sectional view taken along the line 6—6 of FIG. 4 through the connecting rod or pitman of the shear arm oscillating mechanism.

Connecting rod 82 has a construction especially adapted to resist the large tensile force exerted endwise thereon by the heavy shear arm 50. Connecting rod 82 in FIGS. 4 and 6 includes an elongated connecting rod member 84 having a semi-circular recess 84a at one end straddled by outwardly projecting U-shaped arms 84b, 84b and having a bore 84d at the opposite end for receiving the pin and bearing assembly 83. The connecting rod 82 also includes a cap 86 located between arms 84b, 84b and having a mating semi-circular recess 86a forming a circular bore with recess 84a spaced from and parallel to bore 84d for receiving a sleeve bearing 85 which rotatably carried crank pin portion 81b. Suitable keying means is provided for detachably locking cap 86 to connecting rod member 84 with this keying means including two pairs of keyways straddling cap 86 with one pair on each side of the cap. Each pair of keyways includes a keyway 86c in cap 86 and a keyway 84c in arm 84b. A key 87 is located in each pair of keyways with its long dimension in FIG. 4 extending generally parallel to the axis of the bore formed by recesses 84a and 86a so as to minimize separation between these recesses by the tensile force on the connecting rod 82. These keys 87 accurately hold cap 86 in proper relationship with respect to member 84, even through a large separating force is exerted upon the component parts of the connecting rod 82, because the keys present a large shear area to resist the separation. In contrast, through bolts or studs extending in the lengthwise direction of arms 84b, generally used to hold the cap of connecting rod in place, tend to be stretched and elongated by a large tensile force so that the sleeve bearing for the crank pin portion 81b has a very short wear life. In contrast, the construction in FIG. 6 has a very long wear life even though it supports a heavy shear arm 50 weighing many tons.

Suitable fastening means are provided to permit disassembly of cap 86 from member 84 but to normally present their disassembly along the axis of crank pin portion 81b during the operation of the shear. Here, a detachable cylindrical fastener, specifically shown as a bolt 89 having a nut 90, extends through arms 84b and cap 86 generally perpendicular to the axis of this bore to lock member 84 and cap 86 together.

The operation should now be apparent. Shear arm 50 is in its upper position shown in FIGS. 1 and 3 prior to the beginning of the cut-off stroke. Then, stock 115 is fed to the position shown in FIG. 3 to prepare for cut-off. When motor 60 in FIG. 1 is energized, it drives through gear 79 and connecting rod 82 the arm 50 clockwise in FIG. 1 through the shearing stroke from the FIG. 1 to the FIG. 7 position and then through the return stroke in the counterclockwise direction back to the FIG. 1 position in any suitable manner, such as described in more detail in my aforementioned copending application. Now, a length of stock 115a in FIG. 3 has been sheared by blades 52 and 54, arm 50 has returned to the FIG. 3 position, and the shear is in its starting position.

Various changes in details and arrangement of parts may be made by one skilled in the art without departing from either the spirit of this invention or the scope of the appended claim.

What is claimed is:

In a shear, two heavy cutter members including co-acting blades with said members pivotally connected together with one movable and the other stationary, a crank driven construction operatively connecting said members on the opposite side of said blades from said pivot, a drive gear having a central bore and a plurality of radially extending recesses in one face thereof, a drive source having a driven gear in driving relation with said drive gear, a crank having a shaft portion in said gear bore, a crank pin portion radially offset from the axis of said shaft portion and having an arm connecting said portions, said arm being selectively positioned in any one of said recessess so as to locate said arm with respect to a predetermined point on the circumference of said drive gear effective to distribute the wear on the latter, and means securing said arm in said one gear recess to minimize the axial distance between said gear and crank pin portion for any given gear strength and to reduce torsional windup in said mechanism during movement of said movable member.

References Cited in the file of this patent

UNITED STATES PATENTS

| | | |
|---|---|---|
| 771,005 | Fulton | Sept. 27, 1904 |
| 1,562,045 | Pels | Nov. 17, 1925 |
| 1,950,009 | Newman | Mar. 6, 1934 |
| 2,370,311 | Hercik | Feb. 27, 1945 |
| 2,720,794 | Morris | Oct. 18, 1955 |
| 2,800,809 | Pike | July 30, 1957 |
| 2,815,680 | Morris | Oct. 18, 1957 |

FOREIGN PATENTS

| | | |
|---|---|---|
| 16,458 | Great Britain | July 24, 1896 |
| 615,243 | Germany | July 1, 1935 |

UNITED STATES PATENT OFFICE
CERTIFICATE OF CORRECTION

Patent No. 3,073,200                         January 15, 1963

Lad L. Hercik

It is hereby certified that error appears in the above numbered patent requiring correction and that the said Letters Patent should read as corrected below.

Column 3, line 10, for "of" read -- or --; column 4, line 14, for "present" read -- prevent --.

Signed and sealed this 20th day of August 1963.

SEAL)
.ttest:

RNEST W. SWIDER                                      DAVID L. LADD
.ttesting Officer                                         Commissioner of Patents